United States Patent
Brown

(10) Patent No.: US 6,484,440 B2
(45) Date of Patent: Nov. 26, 2002

(54) PERFORATED HOLLOW SPIKE FOR INTRODUCING A WATER SOLUBLE COMPOUND INTO A TREE'S VASCULAR SYSTEM

(76) Inventor: Eddie M. Brown, 42 E. Main St., Duchesne, UT (US) 84021

( * ) Notice: Subject to any disclaimer, the term of this patent is extended or adjusted under 35 U.S.C. 154(b) by 0 days.

(21) Appl. No.: 09/842,757

(22) Filed: Apr. 25, 2001

(65) Prior Publication Data

US 2002/0157307 A1 Oct. 31, 2002

(51) Int. Cl.[7] .................... A01G 29/00; A01G 17/18
(52) U.S. Cl. ........................................ 47/57.5; 47/8
(58) Field of Search ..................... 222/83, 89, 541.2; 47/8, 10, 12, 57.5, 48.5; 8/402; 427/291; 30/121; 429/171

(56) References Cited

U.S. PATENT DOCUMENTS

| | | |
|---|---|---|
| 772,776 A | 10/1904 | Berger |
| 952,245 A | 3/1910 | Gardner |
| 2,044,063 A | 6/1936 | Dahlberg |
| 3,286,401 A | 11/1966 | Mauget |
| 3,295,254 A * | 1/1967 | Schoonman |
| 3,367,065 A | 2/1968 | Cravens |
| 3,730,336 A * | 5/1973 | Feldman ................. 206/47 |
| 3,832,803 A | 9/1974 | Blake et al. |
| 3,968,594 A | 7/1976 | Kawakami |
| 3,992,813 A | 11/1976 | Freshel |
| 4,011,685 A | 3/1977 | Bagwill |
| 4,144,673 A | 3/1979 | Quast et al. |
| 4,637,934 A * | 1/1987 | White .................... 426/117 |
| 4,833,824 A * | 5/1989 | Cronenwett et al. ....... 47/57.5 |
| 4,989,366 A | 2/1991 | DeVlieger |
| 5,330,075 A * | 7/1994 | Brown ..................... 222/82 |
| 5,355,620 A * | 10/1994 | Newbanks .................. 47/58 |
| 5,425,201 A * | 6/1995 | Merving ................... 47/57.5 |
| D366,192 S * | 1/1996 | Dunning et al. ............. D8/2 |
| 6,076,300 A * | 6/2000 | Cronin .................... 47/48.5 |
| D447,921 S * | 9/2001 | Beltz ....................... D8/2 |

FOREIGN PATENT DOCUMENTS

EP  0602564 A1 * 12/1993  ............ A01G/7/06

* cited by examiner

Primary Examiner—Peter M. Poon
Assistant Examiner—Andrea M. Valenti
(74) Attorney, Agent, or Firm—Angus C. Fox, III

(57) ABSTRACT

A spike, drivable into the trunk of a tree, includes a hollow body which provides a storage chamber for a water soluble compound such as a pesticide or fertilizer. The spike has a generally pointed first end which facilitates driving the spike into a tree trunk. The hollow body is equipped with bleed apertures near the pointed end, so that when the spike is driven into the trunk of a tree, the storage chamber is coupled to the vascular system thereof. The spike is supplied with a resilient sheath that seals the bleed apertures during shipping and handling. As the spike is driven into a tree trunk, the sheath is peeled off the body, thereby exposing the bleed apertures to the tree's vascular tissue and forming a gasket between the spike body and the aperture created by driving the spike into the trunk.

16 Claims, 4 Drawing Sheets

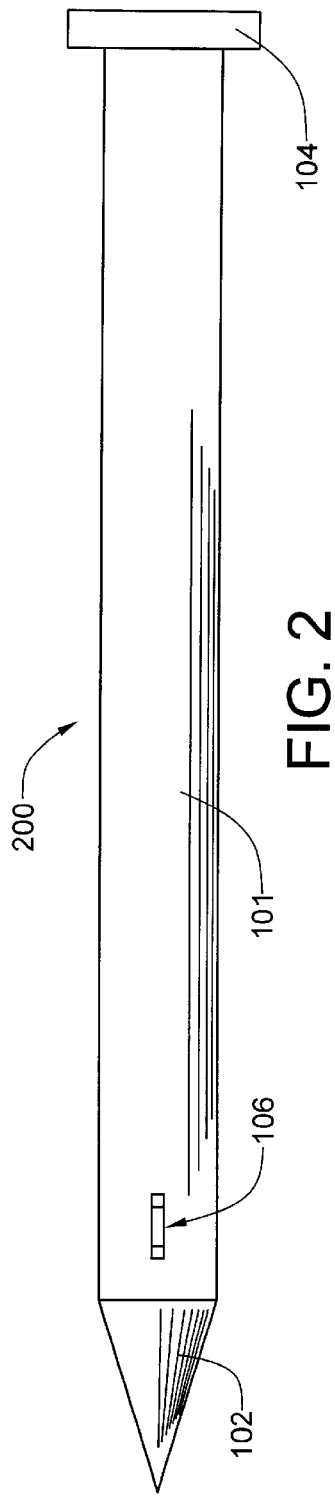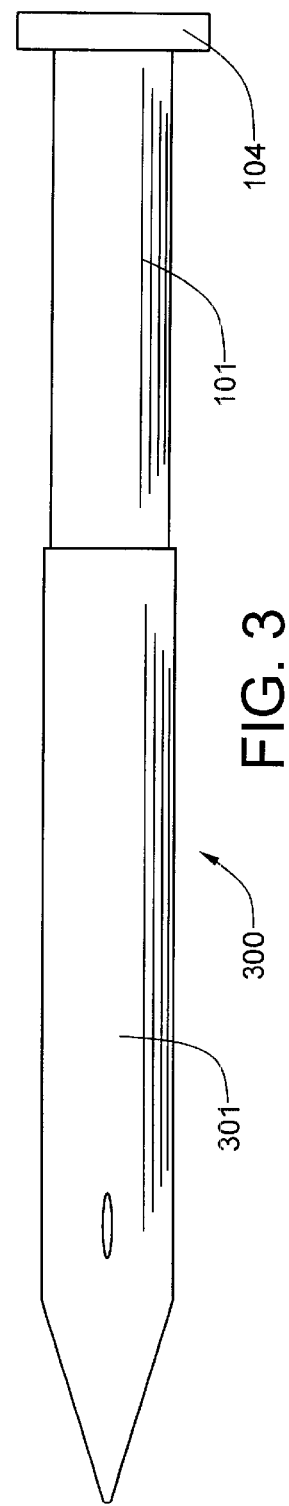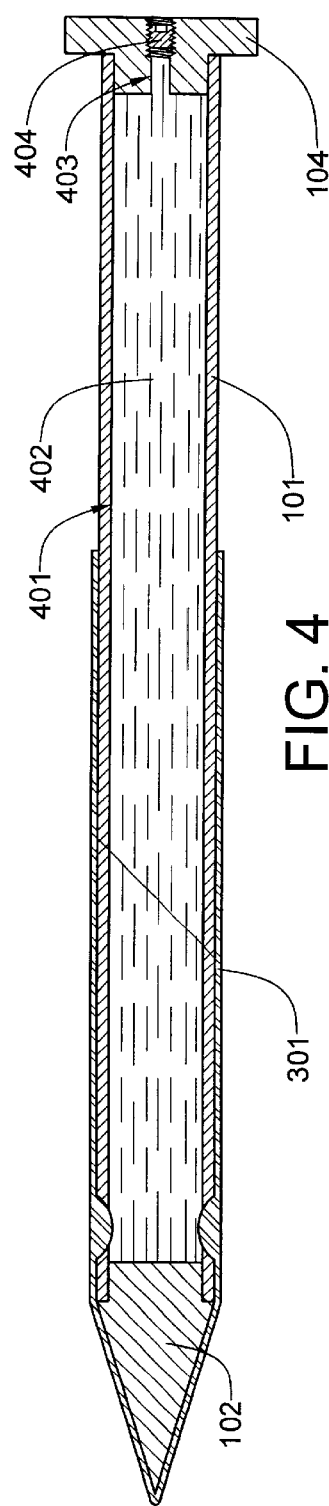

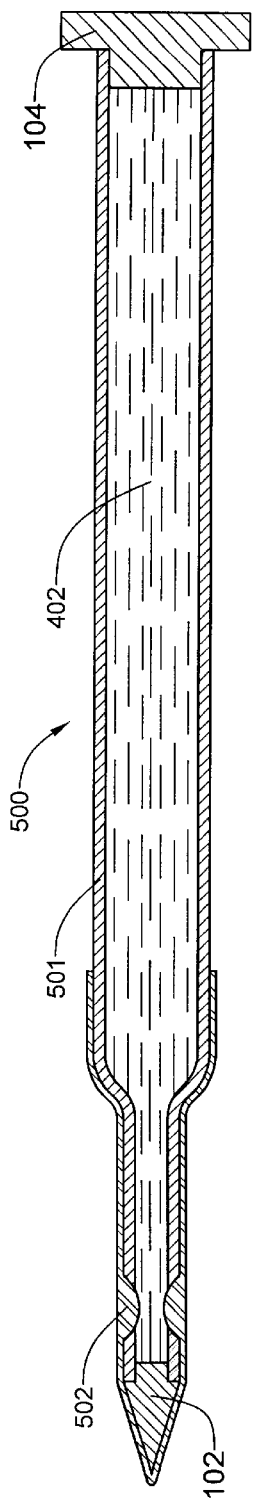
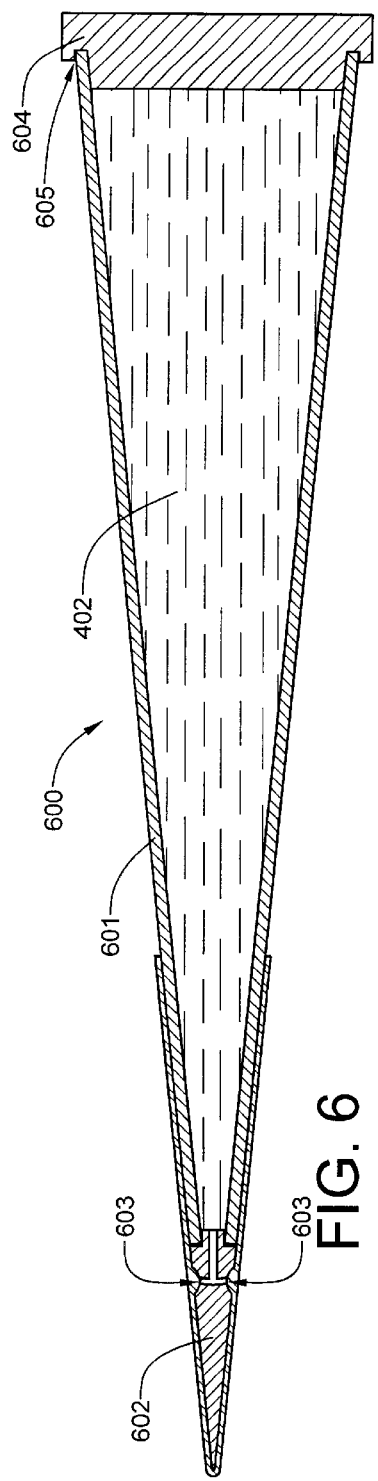
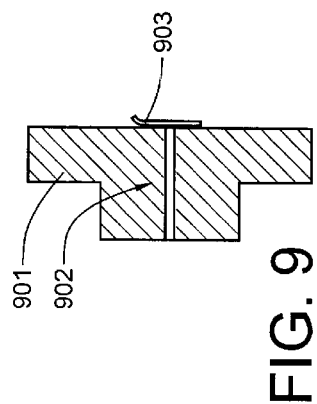
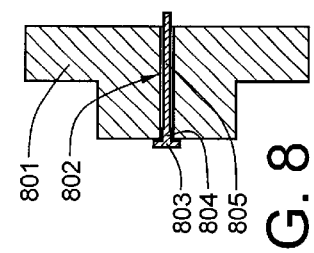

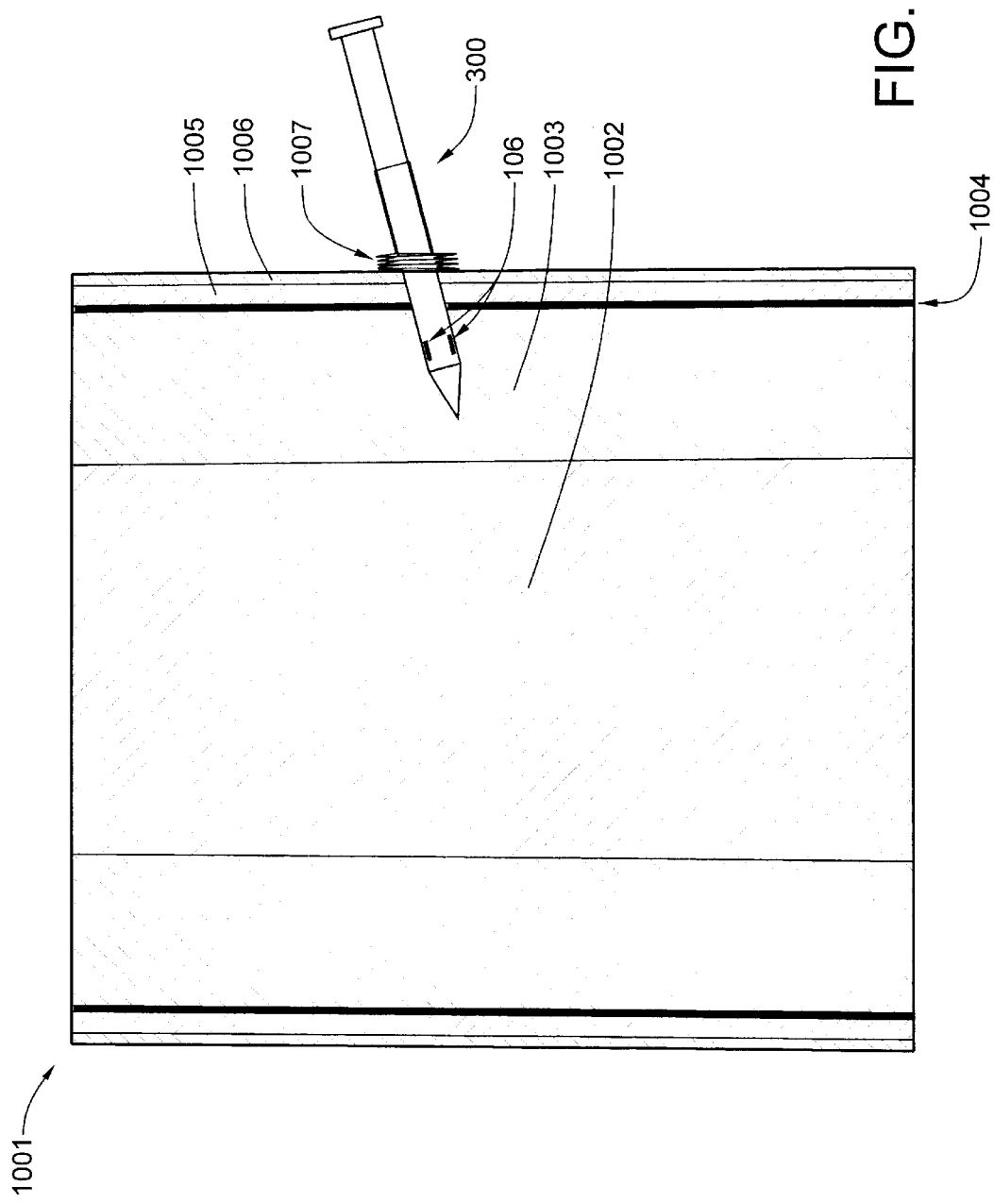

PERFORATED HOLLOW SPIKE FOR INTRODUCING A WATER SOLUBLE COMPOUND INTO A TREE'S VASCULAR SYSTEM

BACKGROUND OF THE INVENTION

1. Field of the Invention

This invention relates to devices for introducing a water soluble compound, such as a pesticide or fertilizer, into the vascular system of plants.

2. Description of the Prior Art

The injection of nutrients, pesticides and dyes into the vascular system of trees and plants has long been known in the art, as evidenced by the issuance of more than a dozen U.S. patents related methods and apparatus since the beginning of the twentieth century. For example, U.S. Pat. No. 952,245 to Levi S. Gardner discloses a process for coloring the wood of living trees by injecting dyes into their vascular systems. U.S. Pat. No. 2,044,063 to Arnold V. Dahlberg, is an example of a process for fertilizing trees and shrubs which bypasses the natural root system by introducing a nutrient solution directly into the cambium layer. More recent patents include U.S. Pat. No. 3,286,401 to James J. Mauget for a pressurized plant injection device and U.S. Pat. No. 4,989,366 to Terry A. DeVlieger for a gravity-feed fluid injection device for trees.

During the past decade, the world economy has experienced explosive economic growth. That growth has resulted in greatly increased demand for paper and lumber. Increased demand and more restrictive logging directives recently promulgated by the U.S. Forest Service have resulted in a doubling of the price of lumber during the same period. Sadly, at this time of increasing demand for timber, whole forests often die from insect infestations. While gypsy moths destroy hardwood trees, bark beetles lay waste to stands of Douglas firs. Annual losses to insect pests total in the billions of dollars.

The spraying of insecticides on forests has several major drawbacks. First, the insecticides are generally non-selective. Thus, both harmful and beneficial insects are killed. Second, aerial spraying of forests is in mountainous regions is quite hazardous. Third, pesticides are expensive, and aerial spraying coats everything, along with the trees. Fourth, much of the sprayed liquid ends up in streams and rivers, with deleterious consequences for animal life living on land and in water.

Though many of the existing injection methods and apparatus would work for injecting pesticides into the vascular tissue of trees, the known methods and devices are either too complex or too expensive to be used to treat entire forests. What is needed is a simple, inexpensive device which can be rapidly installed in the trunks of trees and which can be used to distribute insecticide throughout the vascular system of the tree so that insect pests that feed on parts of the tree will die.

SUMMARY OF THE INVENTION

The present invention includes a spike having a hollow body which provides a storage chamber for a water soluble compound such as a pesticide, fungicide, fertilizer, or any other aqueous solution used for the intravascular treatment of trees. The spike has a generally pointed end which can be driven into the trunk of tree. The hollow body is equipped with bleed apertures near the pointed end, so that when the spike is driven into the trunk of a tree, the storage chamber is coupled to the vascular system thereof. The spike is supplied with a resilient sheath that seals the bleed apertures during shipping and handling. As the spike is driven into a tree trunk, the sheath is peeled off the body, thereby exposing the bleed apertures to the tree's vascular tissue and forming a gasket between the spike body and the aperture created by driving the spike into the trunk.

For a preferred embodiment of the invention, the spike includes a generally elongated, hollow body fabricated from a section of steel tubing. A hammer-drivable head, also made of steel, is welded or adhesively bonded to one end. The head may be either stamped, cast or machined. A pointed end piece, which may be either machined or cast, is welded or adhesively bonded to the opposite end. Bleed apertures are made in the tube wall near the pointed end and the spike is dipped in a solvated liquid polymeric compound. Once the solvent has evaporated, the polymeric compound becomes the resilient sheath, which seals the bleed apertures. When so assembled, a sealed chamber is formed within the tubing between the hammer drivable head and the point. The chamber can be most easily filled with a water soluble solution either by adhesively installing the hammer-drivable head last or by providing an aperture within the head which can be plugged after filling the chamber. For a preferred method of use, the spike is driven into the trunk near the base of the tree until the bleed apertures are positioned within the sapwood. In addition to sealing the fertilizer and/or pesticide containing solution, the sheath serves as a gasket once the spike is driven into a tree trunk, forming a seal which helps to prevent leaks of the solution to the exterior surface of the tree trunk.

If it is deemed important that the wood of the tree not be stained, the spike may be fabricated from stainless steel or heat-treated aluminum.

Alternative embodiments of the invention are also contemplated. For example, the spike may be injection molded from polymeric materials such as polyesters, acrylics, and epoxies, which are reinforced with structural fibers formed from glass, carbon, metal, or similar materials. As an ecological measure, the tree spike may even be cast from fiber-reinforced concrete. For tree spikes manufactured from polymeric materials or fiber-reinforced concrete, it may be preferable to drill, in the tree trunk, a hole having a diameter slightly smaller than that of the spike, so that an interference fit may be achieved without utilizing the spike to create the hole.

In order to rapidly treat large numbers of trees, the spike may be driven into tree trunks using a gun powered by pressurized air or explosive charges.

DESCRIPTION OF THE DRAWINGS

FIG. 2 is an elevational view of an assembled, first embodiment spike without a sheath;

FIG. 3 is an elevational view of the assembled first embodiment tree spike of FIG. 2 with a polymeric sheath installed thereon;

FIG. 4 is a cross-sectional view of the first embodiment tree spike of FIG. 3;

FIG. 5 is a cross-sectional view of a second embodiment tree spike;

FIG. 6 is a cross-sectional view of a third embodiment tree spike;

FIG. 7 is a cross-sectional view of a stamped blunt end piece and plug;

FIG. 8 is a cross-sectional view of a cast or machined end piece having a breather aperture sealed with a dislodgeable sealing pin;

FIG. 9 is a cross-sectional view of a cast or machined end piece having a breather aperture covered by a removable foil tape cover; and FIG. 10 is a cross-sectional view of a first embodiment tree trunk in which a first embodiment tree spike has been embedded.

DETAILED DESCRIPTION OF THE INVENTION

Figure 1:
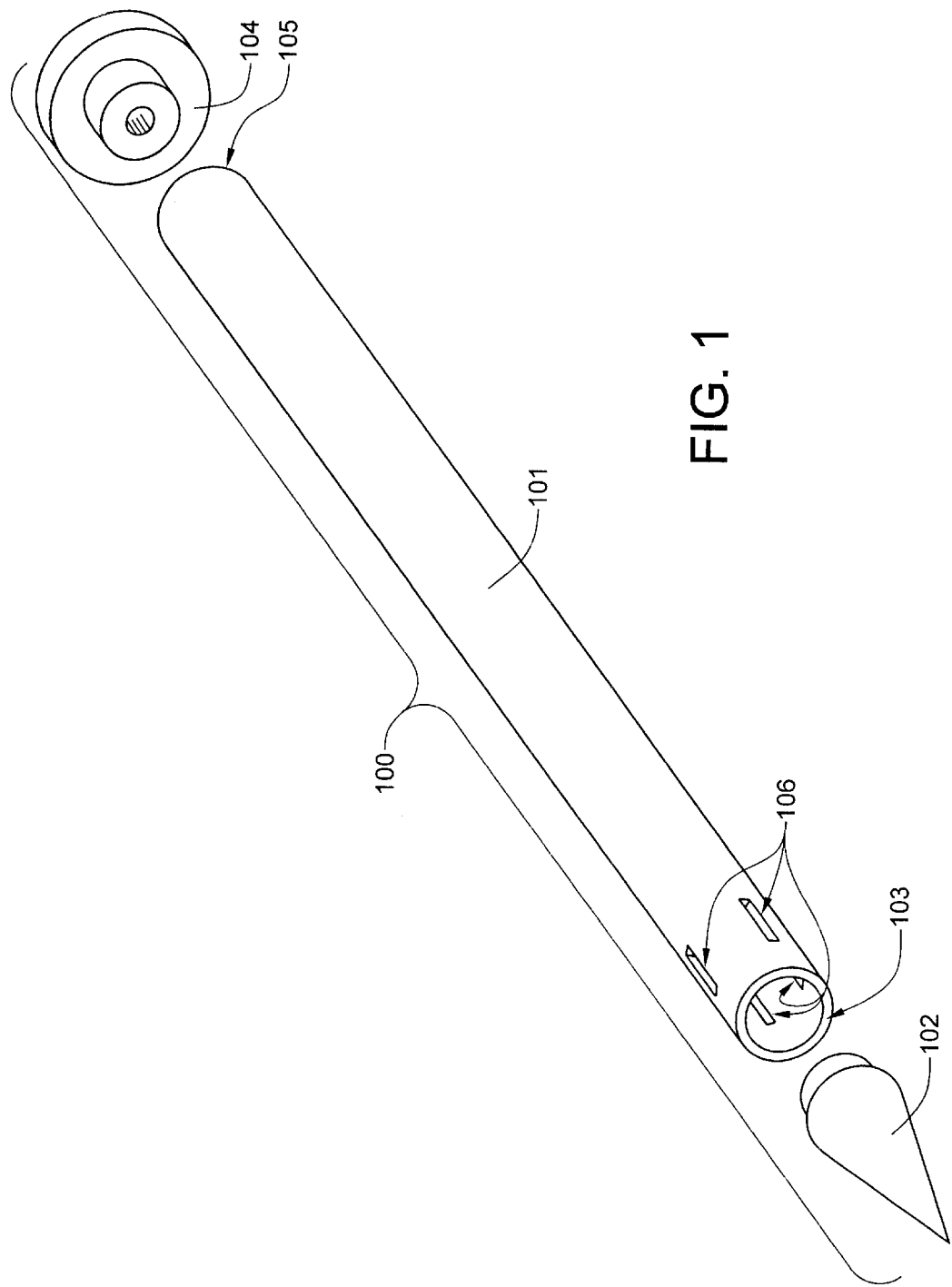
FIG. 1 is an exploded view of an unassembled first embodiment tree spike.

As will be evident from the following description and attached drawing figures, the present invention provides a convenient apparatus and method for introducing an aqueous solution of fertilizer or pesticide, or a combination of the two, into the vascular system of a tree.

Referring now to FIG. 1, an unassembled first embodiment tree spike 100 includes a cylindrical tubular body 101 fabricated form a section of cylindrical tubing. The tubing may be fabricated from a structural metal such as mild steel, stainless steel or heat-treated aluminum. Metals of the latter two types are desirable if it is deemed desirable to maintain the wood of the tree stain free. A pointed end piece 102, which may be either cast or machined, may be welded or adhesively attached to a first end 103 of the tubular body 101. A blunt, hammer-drivable end piece 104, which may be either stamped, cast or machined, may be welded or adhesively attached to a second end 105 of the tubular body 101. It will be noted that the cylindrical body 101 includes several bleed apertures 106 adjacent the first end thereof. The cylindrical body may be filled with a aqueous solution of fertilizer or pesticide prior to the installation of either the pointed end piece 102 or the blunt end piece 104. The aqueous solution will be discharged through the bleed apertures 106 once the spike has been driven into the trunk of a tree.

Referring now to FIG. 2, the various components of FIG. 1 have been assembled into a completed structure 200.

Referring now to FIG. 3, a polymeric sheath 301 has been installed over the pointed end piece 102 and over a major portion of the cylindrical body 101, resulting in a completed tree spike 300. In order to form the sheath 301 for a preferred embodiment of the invention, the pointed end piece 102 and a major portion of the cylindrical body 101 of the completed structure are dipped in a solvated resilient polymeric compound, such as neoprene or plasticized polyvinyl chloride. Once, the solvent has evaporated, the sheath 301 forms a water tight covering, which seals the aqueous solution of fertilizer or pesticide within the chamber formed by the cylindrical body 101, the pointed end piece 102 and the blunt end piece 104 and prevents leaks of the solution through the bleed apertures 106 before the pointed end of the spike 300 is driven into the trunk of a tree.

Referring now to cross-sectional view of FIG. 4, the chamber 401, formed by the cylindrical body 101, the pointed end piece 102, and the blunt end piece 104, is clearly visible. The chamber 401 is filled with the aqueous solution of fertilizer or pesticide 402, which is sealed within the chamber by the sheath 301. The chamber 401 can be most easily filled with a water soluble solution of fertilizer and/or pesticide either by adhesively installing the blunt end piece 104 after the chamber is filled, or by providing a blunt end piece 104 having a threaded aperture 403 which can be stoppered with a threaded plug 404 after the chamber 401 is filled.

Referring now to FIG. 5, a second embodiment tree spike (shown in cross-section) includes a rifle-cartridge-casing-shaped body 501. Other than this variation, it is virtually identical to the first embodiment tree spike 300. Equivalent components, regardless of their relative size, are given identical numbers. The shape of the sheath 502 follows the contour of the body 501.

Referring now to FIG. 6, a conical third embodiment tree spike 600 is shown. The conical-shaped body 601 of this embodiment minimizes the size of a puncture wound in the trunk of a tree into which a solution is to be injected, yet provides a chamber of ample volume for the storage of the water soluble solution 402. The pointed end piece 602 of this embodiment incorporates apertures 603 through which the solution 402 seeps into a tree's vascular system. The blunt end piece has a groove that prevents the body 601 from spreading as it is driven into a tree trunk.

Referring now to FIG. 7, a stamped drivable end piece 701 includes a threaded central aperture 702 and a threaded plug 703. Because the length of the shoulder 704 is limited by the stamping operation, it is deemed preferable to weld the stamped drivable end piece to the cylindrical body 101. The threaded plug 703 permits the chamber to be filled and subsequently sealed.

Referring now to FIG. 8, a cast or machined end piece 801 includes a central breather aperture 802 which, when open, assists in the emptying of the spike chamber, and which is sealed until use by a hammer dislodgeable sealing pin 803. The sealing pin 803 has both a first shank portion 804 with a first diameter that is equal to or slightly greater than that of the aperture 802, and a second shank portion with a diameter that is less than that of the aperture 802. When a tree spike incorporating such an end piece is driven into a tree trunk, the sealing pin 803 is pushed forward by the blow of the driving hammer, thereby unsealing the aperture 802.

Referring now to FIG. 9, a cast or machined end piece 901 includes a central breather aperture 902 that is covered by a user-removable piece of foil tape 903. Once the spike is driven into a tree trunk, the foil tape 903 may be removed to expose the aperture 902.

Referring now to FIG. 10, a first embodiment tree spike 300 is shown embedded within a tree trunk 1001 that is shown in cross section. The tree trunk 1001 comprises a heartwood center portion 1002, a sapwood layer 1003 which surrounds the heartwood 1002, a cambium layer 1004 which surrounds the sapwood layer 1003, an inner bark layer 1005, and an outer covering of outer bark 1006. The outer bark 1006, which is also known as cork, protects the tree. The inner bark, which is also known as phloem, carries food made by the leaves of the tree to other parts thereof. Growth of the tree occurs within the cambium layer, which makes new sapwood and new inner bark. The sapwood layer 1003 carries water and minerals from the roots to the leaves. The principal function of the heartwood center portion 1002 is that of providing mechanical support for the tree. Together, the heartwood and sapwood are known as xylem or wood. In order to properly utilize the tree spike 300, it is driven into the trunk until the bleed apertures 106 are positioned within the sapwood layer 1003. It will be noted that the sheath 301 has peeled back from the pointed end piece 102 and from a portion of the cylindrical body 101, forming an accordioned seal 1007 against the outer bark 1006 of the tree.

Although only several single embodiments of the invention have been heretofore described, it will be obvious to those having ordinary skill in the art that changes and modifications may be made thereto without departing from the scope and the spirit of the invention as hereinafter claimed.

What is claimed is:

1. A spike drivable into the trunk of a tree for introducing an aqueous solution into the vascular system of the tree, said spike comprising:
   a generally tubular body formed from a structural metal which provides a storage chamber, said body having a generally pointed first end which can be driven into the trunk of the tree, and a blunt second end to which a driving force may be applied, said body having, adjacent said first end, at least one bleed aperture through which, an aqueous solution may exit the storage chamber and enter said vascular system when said first end is embedded in the trunk;
   a sheath of polymeric material adhered to said body, said sheath extending from said pointed first end toward said blunt second end, and covering said at least one bleed aperture and a major portion of said body, said sheath annularly detaching itself from the body as the spike is driven into the tree trunk, thereby uncovering the bleed apertures; and
   an aqueous solution of pesticide or fertilizer stored within said chamber.

2. The spike of claim 1, wherein a major portion of said body is fabricated from a section of cylindrical stainless steel tubing.

3. The spike of claim 2, wherein said at least one bleed aperture is tapered, being larger at the exterior of the body than at the interior.

4. The spike of claim 2, which further comprises a threaded plug and wherein said blunt second end is equipped with a threaded aperture, which can be stoppered with said threaded plug after the storage chamber is filled.

5. The spike of claim 1, wherein said sheath is applied to said body and said pointed first end as a solvated solid material.

6. The spike of claim 1, wherein said pointed first end and said blunt second end are fabricated using a forming technique of the class which includes stamping, casting and machining.

7. A spike drivable into the trunk of a tree for introducing an aqueous solution into the vascular system of the tree, said spike comprising:
   a generally hollow, elongated body which provides a storage chamber, said body having a generally pointed first end piece which can be driven into the trunk of the tree, and a blunt second end piece to which a driving force may be applied, said body having, adjacent said first end piece, at least one perforation through which an aqueous solution may exit the storage chamber and enter said vascular system when said first end is embedded in trunk;
   a sheath of resilient polymeric material adhered to said body, said sheath extending from said pointed first end piece toward said blunt second end piece, and covering a major portion of said cylindrical body and said at least one perforation, said sheath annularly detaching itself from the body as the spike is driven into the tree trunk; and
   an aqueous solution of pesticide or fertilizer stored within said chamber.

8. The spike of claim 7, wherein a major portion of said body is fabricated from a section of stainless steel tubing.

9. The spike of claim 8, wherein said tubing is of generally circular cross section.

10. The spike of claim 8, wherein said pointed first end is initially formed as a separate piece and subsequently attached to a first end of said section of tubing.

11. The spike of claim 10, wherein at least one of said end pieces is welded to said section of tubing.

12. The spike of claim 10, wherein said blunt second end piece is initially formed as a separate piece and subsequently attached to a second end of said section of tubing.

13. The spike of claim 12, wherein at least one of said end pieces is adhesively attached to said section of tubing.

14. The spike of claim 7, wherein said body is conically shaped.

15. The spike of claim 7, wherein said body is shaped like a rifle cartridge casing.

16. The spike of claim 7, wherein said blunt end piece incorporates a breather aperture that is opened when the spike is driven into the trunk of a tree to facilitate emptying of the storage chamber.

* * * * *